United States Patent Office 3,512,426
Patented May 19, 1970

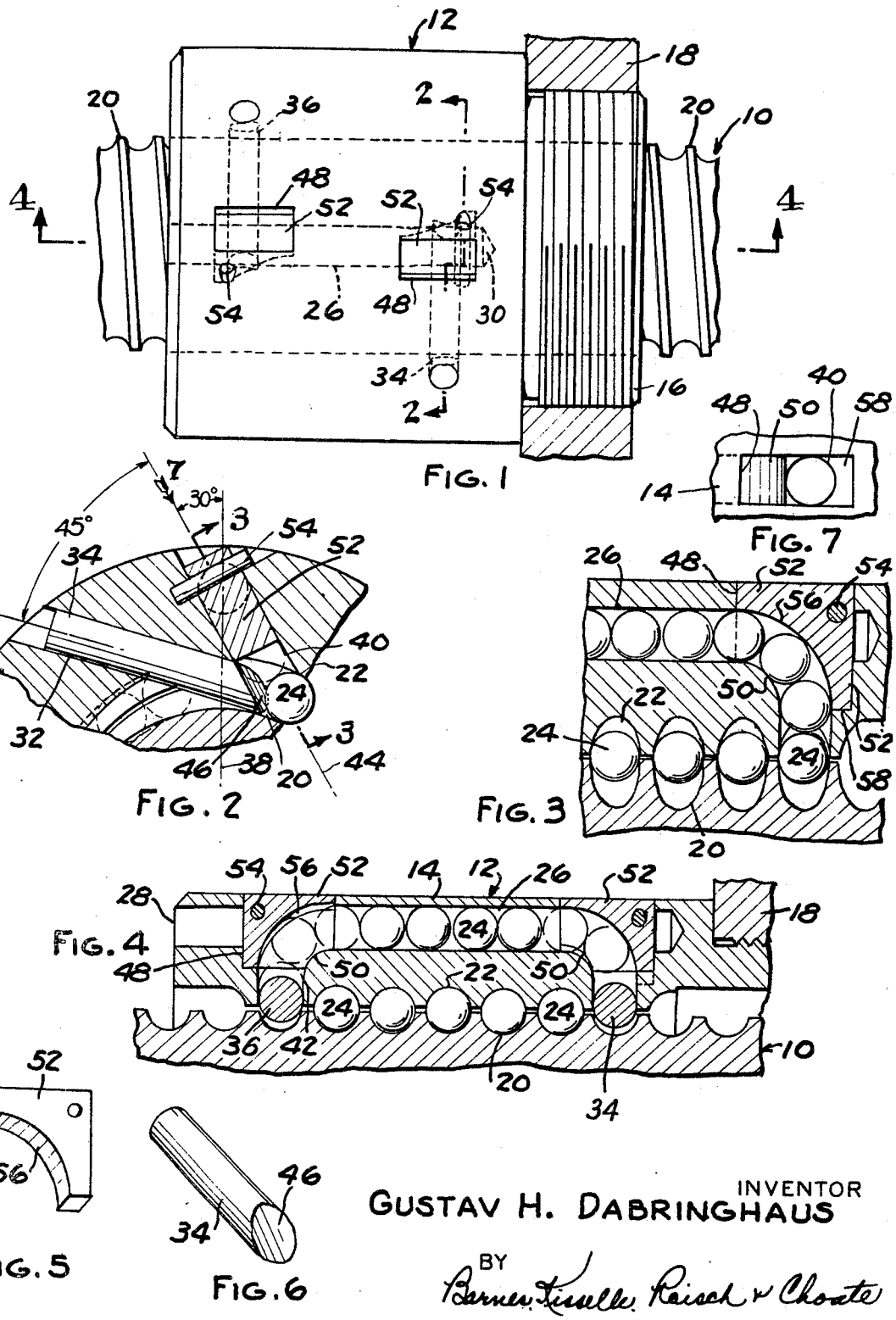

3,512,426
INTERNAL BALL RECIRCULATING MECHANISM FOR RECIRCULATING BALL SCREW AND NUT ASSEMBLY
Gustav H. Dabringhaus, Birmingham, Mich.
(6070 E. Eighteen Mile Road, Utica, Mich. 48087)
Continuation of application Ser. No. 676,773, Oct. 20, 1967. This application June 25, 1969, Ser. No. 840,128
Int. Cl. F16h 1/18; B21h 3/00
U.S. Cl. 74—459                                15 Claims

ABSTRACT OF THE DISCLOSURE

A recirculating ball screw and nut assembly having a ball return passageway extending axially within the nut and a deflector pin and block in the nut adjacent each end of the ball groove therein for directing the bearing balls between the opposite end convolutions of the ball groove and the ball return passageway.

---

This application is a continuation of my copending application Ser. No. 676,773, filed Oct. 20, 1967, now abandoned.

This invention relates to a recirculating ball screw and nut assembly and, more particularly, to an internal ball recirculating mechanism for such assembly.

In many applications where a recirculating ball screw and nut assembly is used it is preferred to have the passageway utilized for returning the bearing balls from one end of the ball groove in the nut to the other end thereof located internally of the mechanism rather than being in the form of an externally-applied tube on the nut. At the present time the manner in which such internal ball return mechanisms are formed are relatively costly and thus are employed only when an externally ball return tube cannot be tolerated.

The present invention has for its object the provision of an internal ball return mechanism for a recirculating ball screw and nut assembly which can be manufactured economically and which is designed so that the bearing balls roll freely throughout their entire path.

More specifically it is an object of this invention to provide a ball return mechanism which involves merely drilling or otherwise forming simply-formed holes in the nut body and inserting simply-formed deflector pins and blocks in the holes so formed.

In the drawing:
FIG. 1 is a fragmentary elevational view, partly in section, of a recirculating ball screw and nut assembly embodying the present invention.
FIG. 2 is a sectional view taken generally along the line 2—2 in FIG. 1.
FIG. 3 is a sectional view along the line 3—3 in FIG. 2.
FIG. 4 is a sectional view taken generally along the line 4—4 in FIG. 1.
FIG. 5 is a perspective view of one of the deflector blocks.
FIG. 6 is a perspective view of one of the deflector pins.
FIG. 7 is a fragmentary view taken generally in the direction of the arrow 7 in FIG. 2 with the ball deflector plug removed.

In FIG. 1 a recirculating ball screw and nut assembly is illustrated, the screw being designated by numeral 10 and the nut by numeral 12. The body 14 of nut 12 has an axial threaded extension 16 at one end for enabling the assembly to be securely mounted on a support 18. Screw 10 is fashioned with a helical ball groove 20 and nut body 14 is fashioned with a cooperating helical ball groove 22 so that when the screw and nut are assembled with bearing balls 24 in the registering ball grooves 20, 22 the screw and nut are interconnected for relative translatory movement in response to relative rotation.

As is conventional with this type of mechanism, when the screw and nut are relatively rotated in one direction the bearing balls 24 follow the helical path of the ball grooves in one axial direction and when relatively rotated in the opposite direction the bearing balls follow the helical path of ball grooves in the opposite direction. Thus, when the bearing balls travel to the end convolution at either end of the nut they must be directed through a suitable passageway to the end convolution at the other end of the nut to enable continuous circulation of the balls. In the arrangement illustrated the ball return mechanism is incorporated into the nut body 14.

After the helical ball groove 22 is formed an axially extending hole 26, which serves as the ball return passageway, is drilled in nut body 14 from one end thereof as at 28. While hole 26 could be drilled entirely through the nut body, in the arrangement illustrated it terminates at 30. Hole 26 serves as a reference axis for the location of additional holes subsequently formed in the nut body. Adjacent each end of the nut body holes 32 are drilled therein as shown in FIG. 2. Holes 32 are so located that at their inner ends they intersect end convolutions of the ball groove 22 in the nut. Within each hole there is press fitted a deflector pin. These deflector pins are referenced 34 and 36. As indicated in FIG. 1, holes 32 are drilled in nut body 14 so that the two deflector pins 34, 36 will be inclined circumferentially in opposite directions and on the opposite sides of the passageway formed by hole 26. Thus, as shown in FIG. 2, pin 34 inclines inwardly and to the right and extends at its inner end into one end convolution of groove 22 beyond the axial plane passing through the axis of passageway 26 and the central axis of the helical ball groove. This axial plane is designated by numeral 38 in FIG. 2. If the other pin 36 were illustrated in FIG. 2 it would extend inwardly and to the left with its inner end extending into the other end convolution of groove 22 beyond the vertical axial plane 38. In other words, the two pins 34, 36 are symmetrically disposed relative to passageway 26.

Nut body 14 has two additional holes formed therein. These holes are designated 40, 42 (FIG. 4). As indicated in FIG. 2, hole 40 has it axis 44 generally intersecting the axis of passageway 26 and inclined to the vertical plane 38 at an angle of about 30°. The other hole 42 is oppositely disposed relative to the axis of passageway 26 so that, as is the case with holes 32, holes 40 and 42 are oppositely inclined and symmetrically disposed relative to the axis of passageway 26. Holes 40, 42 are initially formed as round holes (FIG. 7) with their inner ends intersecting the end convolutions of the ball groove 22 directly adjacent the ends of pins 34, 36. These holes may be formed by a conventional drilling operation or, if desired, they may be formed in the nut body by utilizing a round electrode in an electrical discharge machining operation. The diameter of holes 40, 42 as initially formed corresponds generally with the diameter of passageway 26 and is slightly greater than the diameter of the bearing balls 24.

Before holes 40, 42 are formed in nut body 14, pins 34, 36 are press fitted into their respective holes 32 with the inner ends thereof extending beyond the axial projection of holes 40, 42 so that when holes 40, 42 are machined the cutting tool utilized for initially forming holes 40, 42 (either a drill or a round electrode) will cut through the inner end portions of pins 34, 36 and thus provide the inner ends of these pins with rounded end faces 46 which in effect form inward extensions of holes 40, 42. Since the inner ends of pins 34, 36 project into and obstruct the cooperating ball grooves 20, 22, the rounded, concave end faces 46 of these pins provide smooth deflector surfaces for directing the successive bearing balls in the end convolutions of groove 22 outwardly through the holes 40, 42.

After the holes 40, 42 are formed in the nut and the ends of pins 34, 36 are contoured as indicated at 46, the outer ends of holes 40, 42 are enlarged as at 48. As indicated in FIG. 7, the enlarged holes 48 are generally rectangularly shaped and, accordingly, the operation of enlarging these holes is preferably performed by an electrical discharge machining operation using a rectangularly shaped electrode. The end of the electrode employed is preferably formed with a rounded shoulder on one side thereof so that when the enlarged hole 48 is machined a rounded shoulder 50 is formed to extend from each of the round holes 40, 42 to the adjacent end of the passageway 26 (FIG. 3). The outer ends of the enlarged holes 48 are then plugged by deflector blocks 52 held in place by retaining pins 54. Retaining pins 54 are shown only by way of example as a means for retaining deflector blocks 52 in position. Other means such as welding, cementing, set screws, etc. may be utilized for retaining blocks 52 in position.

The deflector blocks 52 are formed on the under or inner surface thereof with a rounded contour as indicated at 56 so that the curved face 56 of the deflector block and the rounded shoulder 50 on the nut forms a curved passageway in the nut from the holes 40, 42 to the opposite ends of passageway 26. Deflector blocks 52 are accurately located in the nut body 14 in a generally radial direction by forming a shoulder 58 in the enlarged opening 48 on which the deflector blocks are adapted to seat.

With the above described arrangement when the screw 10 and the nut 12 are relatively rotated in one direction, the bearing balls 24 roll progressively through the successive convolutions of the ball grooves on the nut and screw until they reach the end convolution in the nut where each successive bearing ball abuts against the end face 46 of the pin 36. The successive balls are thus deflected by the end face 46 outwardly through the opening 42. The inner curved surface 56 of deflector block 52 in combination with the rounded shoulder 50 then directs the balls to one end of passageway 26. The balls then roll through passageway 26 until they encounter curved surface 56 of the deflector block 52 at the other end of the nut where they are directed inwardly around shoulder 50, through opening 40 and then back into the end convolution at the other end of the nut by the end face 46 of the other deflector pin 34. It will be understood, of course, that when the nut and screw are relatively rotated in the opposite direction the flow of the bearing balls in passageway 26 will be reversed in which case the bearing balls will be deflected outwardly into the opposite end of passageway 26 by the end face 46 of the other deflector pin 34.

The arrangement herein dscribed utilizing deflector pins and deflector blocks provides an internal ball return mechanism which is relatively inexpensive and uncomplicated. The holes required in the nut body are of uncomplicated form and the internal surface of the deflector blocks 52 are of such shape as to be easily machined. In this respect the ball return mechanism disclosed herein differs substantially from and is substantially less costly than an internal ball return mechanism of the type wherein the surface for deflecting the bearing balls out of the ball grooves and the surface for deflecting the bearing balls into the return passageway are both formed on a single deflector block of complicated shape.

What is claimed is:

1. In a recirculating ball screw and nut assembly, means for recirculating the bearing balls between opposite end portions of the helical ball groove in the assembly comprising a ball return passageway extending axially within said nut with its axis disposed radially outwardly of the ball groove therein, a pair of pins in said nut adjacent opposite ends of the ball groove therein, said pins being oppositely inclined and each extending inwardly of the nut from the exterior surface thereof with its inner end projecting into a convolution of the cooperating ball grooves of the screw and nut to interrupt the flow of the balls therein adjacent opposite ends of said cooperating ball grooves, said nut having a pair of openings therein associated one with each said pin, said openings extending inwardly of the nut from the exterior surface thereof, intersecting said ball return passageway adjacent opposite ends thereof and each opening communicating with that portion of the ball groove interrupted by the inner end of the associated pin such that the successive balls interrupted by each pin when the screw and nut are relatively rotated in opposite directions are deflected by the inner ends of said pins in a direction outwardly of the nut into said openings and a deflector block in each of said openings having an inner curved surface extending generally from the inner end portion of said opening to the adjacent end portion of the ball return passageway and each cooperating with the inner end of the associated pin for directing bearing balls between the opposite end portions of the helical ball groove and the ball return passageway.

2. The combination called for in claim 1 wherein said openings are oppositely inclined in a direction circumferentially of the cooperating ball grooves.

3. The combination called for in claim 1 wherein the axis of the ball return passageway is generally parallel to the central axis of the cooperating ball grooves.

4. The combination called for in claim 1 wherein the inner ends of the pins are displaced circumferentially on opposite sides of the axis of the ball return passageway substantially the same extent.

5. The combination called for in claim 1 wherein the axis of each opening is circumferentially inclined at an acute angle to the tangent at its intersection with the cylinder defined by the pitch diameter of the ball groove.

6. The combination called for in claim 1 wherein the inner end face of each pin is generally parallel to the axis of its associated opening.

7. The combination called for in claim 1 wherein each opening is defined in part by a shoulder disposed radially outwardly of the inner end of the opening and said deflector block is seated on said shoulder.

8. The combination called for in claim 1 wherein the axes of said pins and said openings are spaced radially from and generally perpendicularly related to the central axis of the cooperating ball grooves.

9. The combination called for in claim 1 wherein the plane containing the axis of either of said openings and extending parallel to the central axis of the cooperating ball grooves and the plane containing the axis of the associated pin and extending parallel to the axis of the cooperating ball grooves intersect with an included angle of about 45°.

10. The combination called for in claim 1 wherein the axis of the ball return passageway is generally parallel to the axis of the cooperating ball groove and the planes containing the axes of said openings and extending parallel to the central axis of the cooperating ball grooves form an included angle of about 30° with a plane extending through the axis of the cooperating ball grooves and the axis of the ball return passageway.

11. In a recirculating ball screw and nut assembly of the type including a nut having an internal helical ball groove therein, a screw having a similar helical ball groove thereon and extending axially through the nut with the threads of the nut and screw juxtaposed and a series of bearing balls in the cooperating grooves of the nut and screw interengaging the nut and screw for relative rotation and axial movement, that improvement which comprises means forming a ball return passageway extending between opposite end portions of the nut, a pair of pins in said nut adjacent opposite ends of the ball groove therein, said pins being oppositely inclined and extending inwardly of the nut, each pin having its inner end projecting into a convolution of the cooperating ball grooves of the screw and nut to interrupt the flow of balls therein adjacent the opposite end portions of the nut, said nut having a pair of openings therein, associated one with each pin, said openings intersecting said ball return passageway adjacent opposite ends thereof and each opening communicating with that portion of the ball groove interrupted by the inner end of the associated pin such that successive balls interrupted by each pin when the screw and nut are relatively rotated in opposite directions are deflected by the inner ends of the pins in a direction outwardly of the nut into said openings and means in each of said openings forming a deflector having a curved surface extending generally from the inner end portion of said opening to the adjacent end portion of the ball return passageway, each of said deflector means cooperating with the inner end of the associated pin for directing the bearing balls between the opposite end portions of the helical ball groove in the nut and the ball return passageway.

12. The combination called for in claim 11 wherein the axis of each opening is circumferentially inclined at an acuate angle to the tangent at its intersection with the cylinder defined by the pitch diameter of the ball groove.

13. The method of forming a ball return mechanism within the nut member of a recirculating ball screw and nut assembly which comprises forming a straight, axially-extending passageway in the nut member from one end thereof with its axis spaced radially outwardly from the hellical ball groove in the nut member, forming in the opposite end portions of the nut member a round hole extending inwardly from the outer peripheral surface thereof and intersecting a convolution of the ball groove therein adjacent each end of the nut member, inserting a round pin in each of said holes with the inner end of the pin projecting into the intersected convolution, utilizing a cutting tool to form two additional round holes in the nut extending inwardly from the outer peripheral surface thereof one adjacent each end of the nut member, said two additional holes having a diameter generally corresponding to the diameter of the ball groove, said additional holes being formed to intersect the opposite end portions of said passageway and said cutting tool being advanced inwardly to penetrate said convolutions of the ball groove directly adjacent the intersections of said first-mentioned holes and said convolutions whereby to form circular cylindrical faces at the inner ends of said pins so that said curved inner end faces serve as inward extensions of said additional holes whereby the successive bearing balls rolling in said convolutions will be directed by said inner end faces of the pins directly into the ends of the said second-mentioned holes and inserting deflector plugs into the outer ends of the second-mentioned holes, each deflector plug being formed with a curved inner surface for directing the bearing balls between the ends of said passageway and the second-mentioned holes.

14. The method called for in claim 13 including the step of enlarging each of said additional holes inwardly to a depth beyond the location of said axially extending passageway and forming in each enlarged opening a rounded shoulder interconnecting each of the opposite end portions of said axial passageway with said additional openings, said deflector plugs being sized to fit said enlarged openings.

15. The method of forming a ball return mechanism within the nut member of a recirculating ball screw and nut assembly having a helical ball groove therein which comprises, forming a ball return passageway in the nut member extending between opposite end portions thereof, forming in the opposite end portions of the nut member a hole extending inwardly of the nut member and intersecting a convolution of the helical ball groove therein adjacent each end of the nut member, inserting a pin in each of said holes with the inner end of the pin projecting into the intersected convolution, utilizing a cutting tool to form two additional inwardly extending round holes in the nut member, one adjacent each end portion of the nut member, said two additional holes having a diameter generally corresponding to the diameter of the ball groove, said additional holes being formed to intersect opposite end portions of said ball return passageway and said cutting tool being advanced while forming said last-mentioned holes to penetrate the convolutions of the ball groove directly adjacent the intersections of the first-mentioned holes and convolutions whereby to form curved circular cylindrical faces at the inner ends of said pins so that said curved inner faces serve as inward extensions of said additional holes whereby the successive bearing balls rolling in said convolutions will be directed by said curved inner end faces of the pins directly into the second-mentioned holes and inserting deflector means into said second-mentioned holes, each deflector means being formed with a curved surface adjacent the inner end thereof for directing the bearing balls between the ends of said ball return passageway and the second-mentioned holes.

References Cited

UNITED STATES PATENTS

| | | | |
|---|---|---|---|
| 2,298,011 | 10/1942 | Hoffar | 74—459 |
| 2,959,978 | 11/1960 | Boutwell | 74—459 |
| 3,053,105 | 9/1962 | Cole | 74—424.8 |
| 3,068,713 | 12/1962 | Davis | 74—474.8 |

LEONARD H. GERIN, Primary Examiner

U.S. Cl. X.R.

29—159.2